(12) United States Patent
Nam et al.

(10) Patent No.: US 11,981,449 B2
(45) Date of Patent: May 14, 2024

(54) SYSTEM AND METHOD FOR PREVENTING FLIGHT ACCIDENTS OF AN AIR MOBILITY APPARATUS

(71) Applicants: HYUNDAI MOTOR COMPANY, Seoul (KR); KIA CORPORATION, Seoul (KR)

(72) Inventors: Youn Sic Nam, Daejeon (KR); Jong Won Kim, Cheonan-si (KR)

(73) Assignees: HYUNDAI MOTOR COMPANY, Seoul (KR); KIA CORPORATION, Seoul (KR)

(\*) Notice: Subject to any disclaimer, the term of this patent is extended or adjusted under 35 U.S.C. 154(b) by 294 days.

(21) Appl. No.: 17/697,673

(22) Filed: Mar. 17, 2022

(65) Prior Publication Data
US 2022/0388676 A1 Dec. 8, 2022

(30) Foreign Application Priority Data
Jun. 8, 2021 (KR) .................. 10-2021-0074009

(51) Int. Cl.
B64D 45/00 (2006.01)
G06T 3/40 (2024.01)
G06T 5/80 (2024.01)

(52) U.S. Cl.
CPC ............ B64D 45/00 (2013.01); *G06T 3/40* (2013.01); *G06T 5/80* (2024.01); *B64D 2045/0095* (2013.01)

(58) Field of Classification Search
CPC .. B64D 45/00; B64D 2045/0095; G06T 3/40; G06T 5/80; G05D 1/101
See application file for complete search history.

(56) References Cited

U.S. PATENT DOCUMENTS

| 2019/0251356 A1* | 8/2019 | Rivers | G01C 21/203 |
| 2020/0233681 A1* | 7/2020 | Garstenauer | G06F 9/451 |
| 2021/0089055 A1* | 3/2021 | Tran | B64U 10/30 |
| 2021/0326542 A1* | 10/2021 | Hong | G06K 7/10059 |

FOREIGN PATENT DOCUMENTS

| KR | 20180026077 A | 3/2018 |
| KR | 102047271 B1 | 11/2019 |
| KR | 20200041231 A | 4/2020 |

\* cited by examiner

*Primary Examiner* — Ig T An
(74) *Attorney, Agent, or Firm* — Lempia Summerfield Katz LLC

(57) ABSTRACT

A system and method for preventing flight accidents of an air mobility to prevent collision between the air mobility and birds and to secure flight stability by forming an image in front of the air mobility during flight of the air mobility such that birds perceive and avoid the image.

12 Claims, 5 Drawing Sheets

SYSTEM AND METHOD FOR PREVENTING FLIGHT ACCIDENTS OF AN AIR MOBILITY APPARATUS

CROSS-REFERENCE TO RELATED APPLICATION

This application claims priority to and the benefit of Korean Patent Application No. 10-2021-0074009, filed on Jun. 8, 2021, in the Korean Intellectual Property Office, the disclosure of which is incorporated herein by reference.

BACKGROUND

1. Field

The present disclosure relates to a system and method for preventing flight accidents of an air mobility to prevent collision with birds during flight of the air mobility.

2. Description of the Related Art

As used throughout this patent, the term "mobility" is intended to mean any moving vehicle, device, machine, instrument, apparatus, or the like. Recently, air mobilities having various applications such as cargo transportation (e.g., air mobilities with cargo containers) and medical transportation have been developed and put to practical use according to improvements in energy efficiency and stabilization thereof.

Such air mobilities may collide with obstacles such as birds during flight. If an air mobility collides with a bird during flight, the airframe thereof may be damaged, and a crash may occur.

Conventionally, the presence or absence of birds on air mobility travel routes is detected to warn an air mobility in advance using expensive techniques such as satellite navigation and observation satellites. However, methods using satellite navigation and observation satellites require a large number of observation satellites and navigation equipment and complicated systems for associating information according to the observation satellites and navigation equipment with air mobilities. Furthermore, air mobilities hardly avoid birds because it is difficult to detect birds moving in the sky.

It should be understood that the above matters described in the related art are merely for promotion of understanding of the background of the disclosure and should not be recognized as prior art known to those having ordinary skill in the art.

SUMMARY

Therefore, the present disclosure has been made in view of the above problems. It is an object of the present disclosure to provide a system and method for preventing flight accidents of an air mobility to secure flight stability by preventing collision with birds during flight.

In accordance with an aspect of the present disclosure, the above and other objects can be accomplished by the provision of a system for preventing flight accidents of an air mobility that includes an image formation device provided in the air mobility and configured to form an image in front of the air mobility in a flying direction of the air mobility. The system for preventing flight accidents of an air mobility also includes a controller configured to receive flight state information of the air mobility, to control the image formation device to form an image during flight of the air mobility, and to correct a position at which the image is formed and a shape of the image in response to a flying speed of the air mobility.

The image formed by the image formation device may be a wall in a lattice pattern.

The image formed by the image formation device may match a front shape of the air mobility and may be set to be equal to or larger than the front shape of the air mobility.

The controller may control the image formation device not to operate when the air mobility takes off or lands. The controller may control the image formation device to operate when the air mobility is flying forward.

The controller may determine a presence or absence of an obstacle through a sensor and control the image formation device to operate upon determining that an obstacle is present through the sensor.

The controller may correct the position at which the image is formed such that the position becomes far away from the air mobility in response to a flying speed of the air mobility and a predetermined obstacle avoidance time when the flying speed of the air mobility increases.

The controller may correct the shape of the image such that the image is enlarged in response to the flying speed of the air mobility and the predetermined obstacle avoidance time when the flying speed of the air mobility increases.

In accordance with another aspect of the present disclosure, there is provided a method for preventing flight accidents of an air mobility, including ascertaining a flight state of the air mobility, forming an image in front of the air mobility in a flying direction of the air mobility during flight of the air mobility, and correcting a position at which the image is formed and a shape of the image in response to a flying speed of the air mobility.

The image formed in the forming of the image may be a wall in a lattice pattern. The border of the image may match a front shape of the air mobility. The image may be set to be equal to or larger than the front shape of the air mobility.

The forming of the image may include controlling an image formation device not to operate when the air mobility takes off or lands and controlling the image formation device to operate when the air mobility is flying forward.

The correcting of the position at which the image is formed and the shape of the image may include correcting the position at which the image is formed such that the position becomes far away from the air mobility in response to a flying speed of the air mobility and a predetermined obstacle avoidance time when the flying speed of the air mobility increases.

The correcting of the position at which the image is formed and the shape of the image may include correcting the shape of the image such that the image is enlarged in response to the flying speed of the air mobility and the predetermined obstacle avoidance time when the flying speed of the air mobility increases.

BRIEF DESCRIPTION OF THE DRAWINGS

The above and other objects, features and other advantages of the present disclosure should be more clearly understood from the following detailed description taken in conjunction with the accompanying drawings, in which.

DETAILED DESCRIPTION OF THE EMBODIMENTS

Hereinafter, a system and method for preventing flight accidents of an air mobility according to embodiments of the present disclosure are described with reference to the accompanying drawings. When a component, device, element, or the like of the present disclosure is described as having a purpose or performing an operation, function, or the like, the component, device, or element should be considered herein as being "configured to" meet that purpose or to perform that operation or function.

Figure 1:
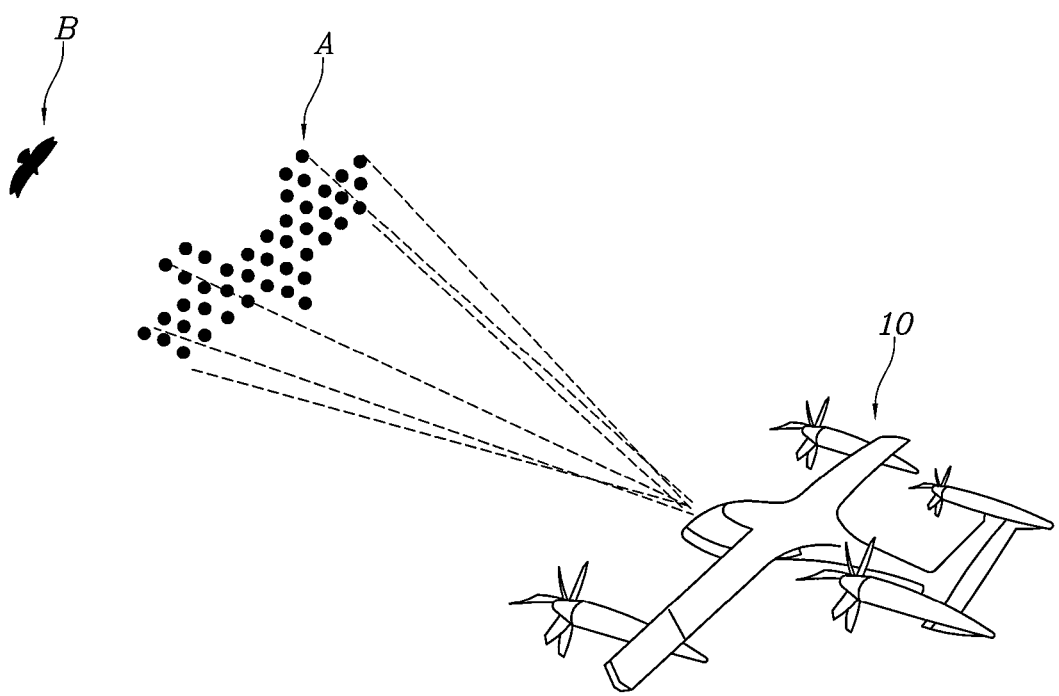
FIG. 1 is a diagram illustrating a system for preventing flight accidents of an air mobility according to an embodiment of the present disclosure.
Figure 2:
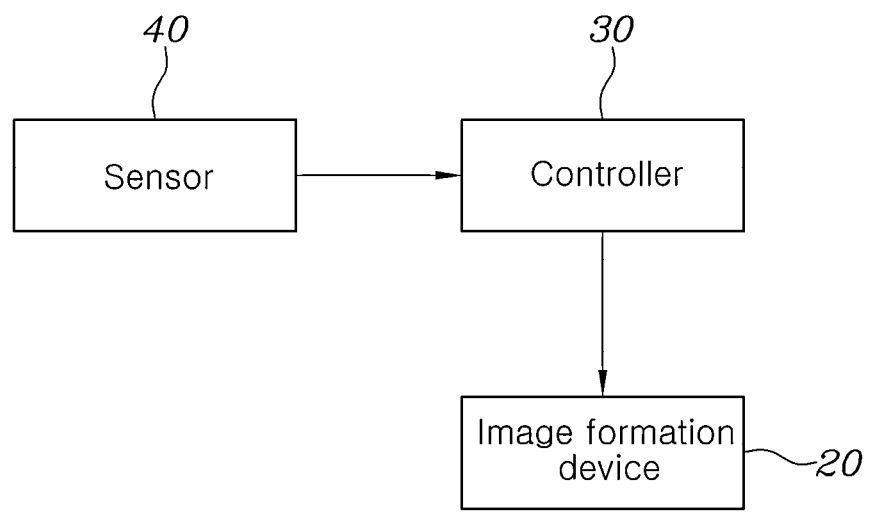
FIG. 2 is a block diagram of the system for preventing flight accidents of an air mobility according to an embodiment of the present disclosure.
Figure 3:
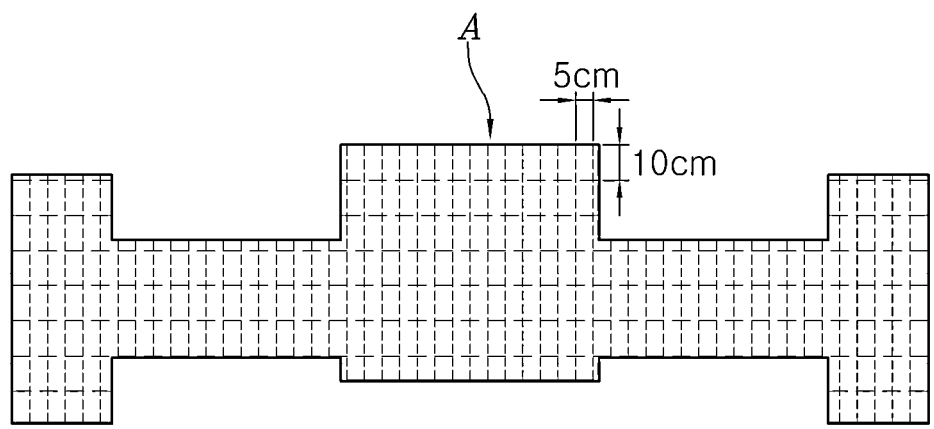
FIG. 3 is a diagram illustrating an image formed by an image formation device.
Figure 4:
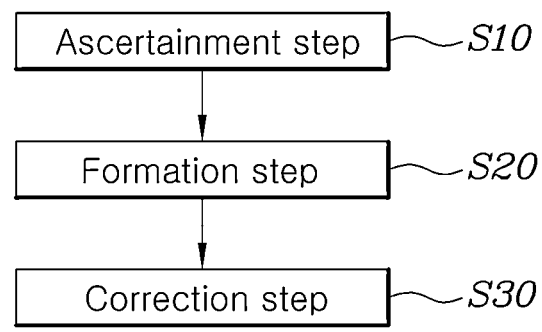
FIGS. 4 and 5 are flowcharts of a method for preventing flight accidents of an air mobility according to an embodiment of the present disclosure.
Figure 5:
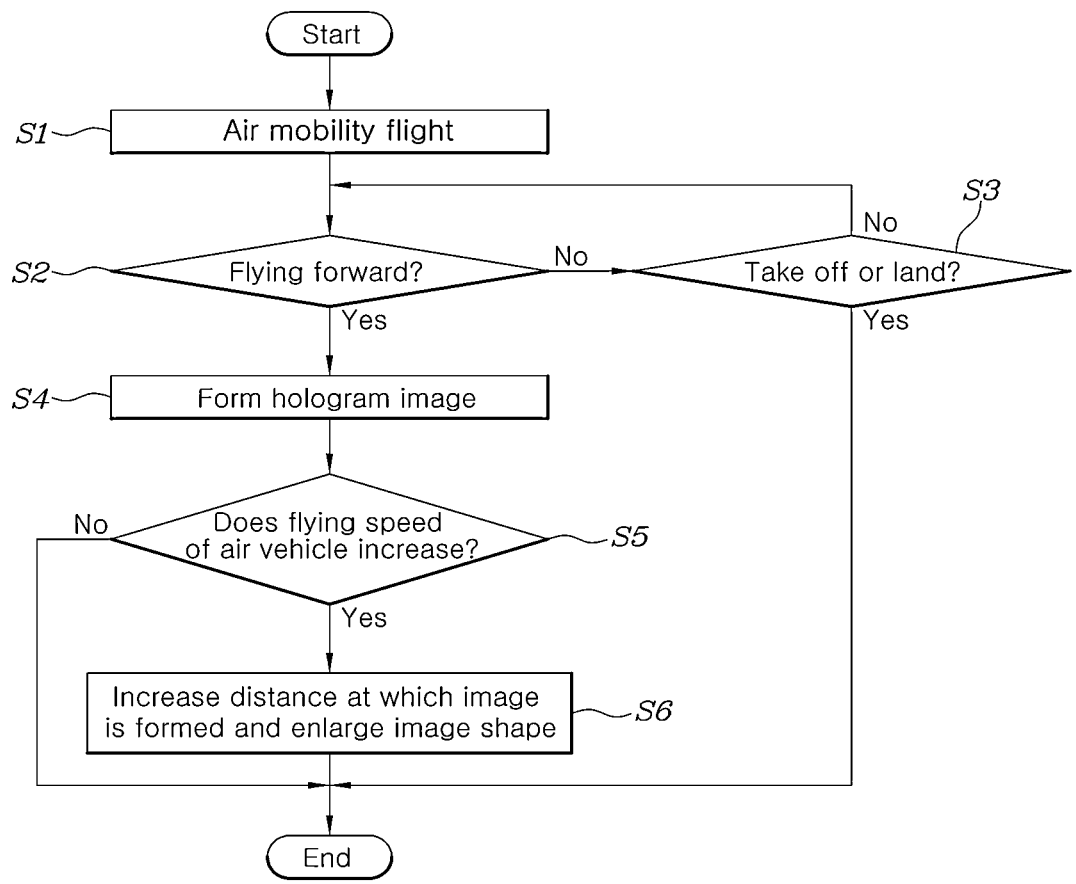

FIG. 1 is a diagram illustrating a system for preventing flight accidents of an air mobility according to an embodiment of the present disclosure. FIG. 2 is a block diagram of the system for preventing flight accidents of an air mobility according to an embodiment of the present disclosure. FIG. 3 is a diagram illustrating an image formed by an image formation device. FIGS. 4 and 5 are flowcharts of a method for preventing flight accidents of an air mobility according to an embodiment of the present disclosure.

As illustrated in FIGS. 1 and 2, the system for preventing flight accidents of an air mobility according to an embodiment of the present disclosure includes an image formation device 20 mounted in an air mobility 10. The image formation device 20 forms a predetermined image in front of the air mobility 10 in a flying direction. The system further includes a controller 30 that receives flight state information of the air mobility 10, controls the image formation device 20 to form an image while the air mobility 10 is flying, and corrects a position at which the image is formed or the shape of the image in response to a flying speed of the air mobility 10.

In this example, the image formation device 20 is a device that radiates a pulse laser beam and is configured to project a hologram image A in front of the air mobility 10 in a flying direction. Accordingly, the image formation device 20 may be provided in the front part of the air mobility 10 and the projected hologram image is preset therein.

The image A set in the image formation device 20 may be an image that may be perceived by birds B and may cause the birds B to avoid the image A. In other words, the image A formed by the image formation device 20 may be a wall in a lattice pattern.

For example, the image may be formed to have rectangular shapes (each having a horizontal size of 5 cm and a vertical size of 10 cm), as illustrated in FIG. 3. In other words, the birds B perceive a lattice space (having a horizontal size of 5 cm and a vertical size of 10 cm) as a space through which they can hardly pass and thus they may avoid the lattice image and make a detour. By using this method, the image A formed by the image formation device 20 may be formed in a shape that causes the birds B to avoid the image. In this manner, the image A that causes the birds B to perceive and avoid it may be set in the image formation device 20 in various manners.

The image formed by the image formation device 20 may match the front shape of the air mobility 10 and may be set to be equal to or larger than the front shape of the air mobility 10.

In other words, the image A is formed to match the front shape of the air mobility 10 such that the birds B in front of the air mobility 10 perceive and avoid the image A and thus do not collide with the air mobility 10. Further, the image A may be formed in a size equal to or greater than the area of the front shape of the air mobility 10 such that the birds B safely avoid the air mobility 10 upon perceiving the image.

The controller 30 that controls the image formation device 20 receives flight state information of the air mobility 10. Accordingly, the controller 30 collects information in response to a flying speed of the air mobility 10 and corrects a position at which the image is formed or the shape of the image in response to the flying speed of the air mobility 10.

Specifically, to prevent collision between the air mobility 10 and birds, a distance at which birds in front of the air mobility 10 can perceive and avoid the image formed by the image formation device 20 needs to be determined. A time in which birds can perceive and avoid the image formed by the image formation device 10 decreases as the flying speed of the air mobility 10 increases. Accordingly, the controller 30 corrects a position at which the image is formed or the shape of the image in response to the flying speed of the air mobility 10 such that birds perceive the image and safely avoid the air mobility 10.

Accordingly, even when the flying speed of the air mobility 10 increases, birds safely avoid the image formed by the image formation device 10 upon perceiving the image. Thus, collision between the air mobility 10 and the birds is prevented and flight stability of the air mobility 10 is secured.

The controller 30 controls the image formation device 20 not to operate when the air mobility 10 takes off or lands and controls the image formation device 20 to operate when the air mobility 10 is flying forward.

In other words, when the air mobility 10 takes off or lands, birds colliding with the air mobility 10 does not occur because the air mobility moves upward or downward. Although an image may be formed above or below the air mobility 10, this requires an additional image formation device 20, which increases manufacturing costs. Accordingly, the system is configured to form an image in front of the air mobility 10 through the image formation device 20.

In addition, when the air mobility 10 is flying forward, the altitude of the air mobility 10 is high and thus the risk of an accident is high. Accordingly, the controller 30 controls the image formation device 20 to operate when the air mobility 10 is flying forward such that birds avoid collision with the air mobility 10 through the image formed in front of the air mobility 10.

The controller 30 may determine a presence or absence of an obstacle through a sensor 40 and may control the image formation device 20 to operate upon determining that an obstacle is present through the sensor 40.

The sensor 40 may be a laser sensor or a camera. The controller 30 may control the image formation device 20 to operate when obstacles such as birds present in front of the air mobility 10 are detected through the sensor 40 to secure flight stability of the air mobility 10.

When the flying speed of the air mobility 10 increases, the controller 30 may correct a position at which the image is formed such that the position becomes far away from the air mobility 10 in response to the flying speed of the air mobility 10 and an obstacle avoidance time.

In other words, when the flying speed of the air mobility 10 increases, a time in which birds can avoid the air mobility 10 decreases although the birds perceive the image. Accordingly, the controller 30 corrects the position at which the image is formed by the image formation device such that the position becomes far away from the air mobility 10 when the flying speed of the air mobility 10 increases to allow birds to safely avoid the air mobility 10 upon perceiving the image.

The obstacle avoidance time may be set to a time necessary for birds to perceive and avoid the air mobility 10.

As described above, the controller 30 may correct the position at which the image is formed in response to the flying speed of the air mobility 10 and a predetermined obstacle avoidance time such that the position becomes far away from the air mobility 10 when the flying speed of the air mobility 10 increases to allow birds to perceive the image formed far away from the air mobility 10 in advance and safely avoid the air mobility 10.

Further, the controller 30 corrects the image such that it is enlarged in response to the flying speed of the air mobility 10 and the predetermined obstacle avoidance time when the flying speed of the air mobility 10 increases.

In other words, when the flying speed of the air mobility 10 increases, a time in which birds can avoid the air mobility 10 decreases although the birds perceive the image. Accordingly, the controller 30 causes the image formed by the image formation device 20 to be enlarged when the flying speed of the air mobility 10 increases to allow birds to rapidly or more easily perceive the image. In this manner, the controller 30 may correct the image such that it is enlarged in response to the flying speed of the air mobility 10 and the predetermined obstacle avoidance time when the flying speed of the air mobility 10 increases to allow birds to perceive the enlarged image and safely avoid the air mobility 10.

As illustrated in FIGS. 4 and 5, a method for preventing flight accidents of the air mobility 10 according to the present disclosure includes a step S10 of ascertaining a flight state of the air mobility 10, a step S20 of forming an image in front of the air mobility 10 in a flying direction during flight of the air mobility 10, and a step S30 of correcting a position at which the image is formed or the shape of the image in response to a flying speed of the air mobility 10.

The present disclosure forms an image that can be perceived by birds in front of the air mobility 10 such that the birds perceive the image and avoid the air mobility 10. When the flying speed of the air mobility 10 is high, a time in which birds can perceive the image and avoid the air mobility 10 is short.

Accordingly, the present disclosure corrects a position at which the image is formed or the shape of the image in response to the flying speed of the air mobility 10 such that birds perceive the image and safely avoid the air mobility 10.

Accordingly, even when the flying speed of the air mobility 10 increases, birds safely avoid the air mobility 10 upon perceiving the image formed by the image formation device 10. Thus, collision between the air mobility 10 and the birds is prevented and flight stability of the air mobility 10 is secured.

The image formed in step S20 may be a wall in a lattice pattern. The border of the image may match the front shape of the air mobility 10. The image may be set to be equal to or larger than the front shape of the air mobility 10.

In this manner, an image that can be perceived by birds and cause the birds to avoid the air mobility 10 may be formed. Further, the image may be formed to match the front shape of the air mobility 10 such that birds in front of the air mobility 10 perceive and avoid the image and thus do not collide with the air mobility 10. In addition, the image may be formed in a size equal to or greater than the area of the front shape of the air mobility 10 such that birds safely avoid the air mobility 10 upon perceiving the image.

The controller 30 controls the image formation device 20 not to operate when the air mobility 10 takes off or lands and controls the image formation device 20 to operate when the air mobility 10 is flying forward.

In other words, when the air mobility 10 takes off or lands, birds colliding with the air mobility 10 does not occur because the air mobility moves upward or downward. In addition, when the air mobility 10 is flying forward, the altitude of the air mobility 10 is high and thus the risk of an accident is high. Accordingly, the controller 30 controls the image formation device 20 to operate when the air mobility 10 is flying forward such that birds avoid collision with the air mobility 10 through the image formed in front of the air mobility 10.

In correction step S30, when the flying speed of the air mobility 10 increases, a position at which the image is formed is corrected such that it becomes far away from the air mobility 10 in response to the flying speed of the air mobility 10 and an obstacle avoidance time.

In other words, when the flying speed of the air mobility 10 increases, a time in which birds can avoid the air mobility 10 decreases although the birds perceive the image. Accordingly, the position at which the image is formed is corrected such that it becomes far away from the air mobility 10 when the flying speed of the air mobility 10 increases to allow birds to safely avoid the air mobility 10 upon perceiving the image.

Further, in correction step S30, the image is corrected such that it is enlarged in response to the flying speed of the air mobility 10 and the predetermined obstacle avoidance time when the flying speed of the air mobility 10 increases.

In other words, when the flying speed of the air mobility 10 increases, a time in which birds can avoid the air mobility 10 decreases although the birds perceive the image. Accordingly, the image formed by the image formation device 20 may be enlarged when the flying speed of the air mobility 10 increases to allow birds to rapidly or more easily perceive the image. In this manner, the controller 30 may correct the image such that it is enlarged in response to the flying speed of the air mobility 10 and the predetermined obstacle avoidance time when the flying speed of the air mobility 10 increases to allow birds to perceive the enlarged image and stably avoid the air mobility 10.

As described above, an image is formed in front of the air mobility 10 and the position or size of the image is corrected in response to the flying speed of the air mobility 10 through control as shown in the flowchart (S1 to S6) of FIG. 5 such that birds perceive the image and avoid the air mobility 10 to prevent collision between birds and the air mobility 10. As illustrated in FIG. 5, a method for preventing flight accidents of the air mobility 10 according to the present disclosure includes steps S1-S3 of ascertaining a flight state of the air mobility 10 (such as flying forward S2 or taking off or landing S3), a step S4 of forming an image, such as a hologram image, in front of the air mobility 10 in a flying direction during flight of the air mobility 10, and steps S5 and S6 of correcting a position at which the image is formed or the shape of the image (such as increasing a distance at which the image is formed and enlarging the image shape S6) in response to a flying speed of the air mobility 10, such as when the flying speed of the air mobility 10 increases S5.

According to the above-described system and method for preventing flight accidents of the air mobility 10, an image is formed in front of the air mobility 10 during flight of the air mobility 10 such that birds perceive and avoid the image to prevent collision between the air mobility 10 and birds and secure flight stability.

Although embodiments of the present disclosure have been disclosed for illustrative purposes, those having ordinary skill in the art should appreciate that various modifications, additions and substitutions are possible, without departing from the scope and spirit of the disclosure in the accompanying claims.

What is claimed is:

1. A system for preventing flight accidents of an air mobility, the system comprising:
    an image formation device provided in the air mobility and configured to form an image in front of the air mobility in a flying direction of the air mobility; and
    a controller configured to receive flight state information of the air mobility, to control the image formation device to form an image during flight of the air mobility, and to correct a position at which the image is formed and a shape of the image in response to a flying speed of the air mobility.

2. The system according to claim 1, wherein the image formed by the image formation device is a wall in a lattice pattern.

3. The system according to claim 1, wherein the image formed by the image formation device matches a front shape of the air mobility and is set to be equal to or larger than the front shape of the air mobility.

4. The system according to claim 1, wherein the controller controls the image formation device not to operate when the air mobility takes off or lands and controls the image formation device to operate when the air mobility is flying forward.

5. The system according to claim 1, wherein the controller determines a presence or absence of an obstacle through a sensor and controls the image formation device to operate upon determining that an obstacle is present through the sensor.

6. The system according to claim 1, wherein the controller corrects the position at which the image is formed such that the position becomes far away from the air mobility in response to a flying speed of the air mobility and a predetermined obstacle avoidance time when the flying speed of the air mobility increases.

7. The system according to claim 1, wherein the controller corrects the shape of the image such that the image is enlarged in response to the flying speed of the air mobility and a predetermined obstacle avoidance time when the flying speed of the air mobility increases.

8. A method for preventing flight accidents of an air mobility, comprising:
    ascertaining a flight state of the air mobility;
    forming an image in front of the air mobility in a flying direction of the air mobility during flight of the air mobility; and
    correcting a position at which the image is formed and a shape of the image in response to a flying speed of the air mobility.

9. The method according to claim 8, wherein the image formed in the forming of the image is a wall in a lattice pattern, wherein the border of the image matches a front shape of the air mobility, and wherein the image is set to be equal to or larger than the front shape of the air mobility.

10. The method according to claim 8, wherein the forming of the image comprises controlling an image formation device not to operate when the air mobility takes off or lands and controlling the image formation device to operate when the air mobility is flying forward.

11. The method according to claim 8, wherein the correcting of the position at which the image is formed and the shape of the image comprises correcting the position at which the image is formed such that the position becomes far away from the air mobility in response to a flying speed of the air mobility and a predetermined obstacle avoidance time when the flying speed of the air mobility increases.

12. The method according to claim 8, wherein the correcting of the position at which the image is formed and the shape of the image comprises correcting the shape of the image such that the image is enlarged in response to the flying speed of the air mobility and a predetermined obstacle avoidance time when the flying speed of the air mobility increases.

* * * * *